May 30, 1961  E. WILLEMS ET AL  2,986,648
ELECTRICAL CONTROL CIRCUIT
Filed Dec. 3, 1954

INVENTORS
EBERTUS WILLEMS &
ADRIANUS JOHANNES WILHELMUS
MARIE VAN OVERBEEK
BY
Fred M. Vogel
AGENT United States Patent Office 2,986,648
Patented May 30, 1961

2,986,648

ELECTRICAL CONTROL CIRCUIT

Ebertus Willems and Adrianus Johannes Wilhelmus Márie van Overbeek, Emmasingel, Eindhoven, Netherlands, assignors, by mesne assignments, to North American Philips Company, Inc., New York, N.Y., a corporation of Delaware Filed Dec. 3, 1954, Ser. No. 472,962

Claims priority, application Netherlands Dec. 4, 1953

13 Claims. (Cl. 307—88.5)

The present invention relates to a transistor circuit arrangement for controlling a load. More particularly, the invention relates to a circuit arrangement for controlling an electric load via a transistor, the load being included in series with the supply in the circuit between the collector electrode and the emitter electrode of the transistor. It has, more particularly, for its object to provide a circuit arrangement which permits, by means of an alternating supply voltage, the supply of a considerable, controllable power to the load; for example, a power which exceeds materially the maximum permissible dissipation of the transistor.

The invention is characterized in that a source of blocking potential cutting off the transistor is included in the circuit between the emitter electrode and the base electrode. The supply providing an alternating voltage is also operative across the last-mentioned circuit and exceeds the said blocking potential during a controllable part of its period and thus releases the transistor for operation.

The invention will now be described more fully with reference to the accompanying drawing, wherein.

Figure 1:
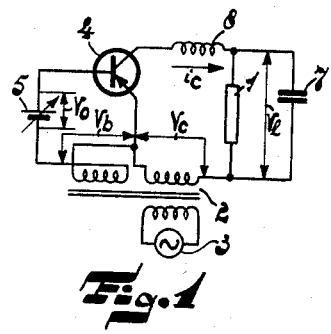
Fig. 1 is a schematic diagram of an embodiment of the circuit arrangement of the present invention.

Referring to Fig. 1, an electric load 1, for example a motor or a relay, is included in series with an alternating supply voltage source 3 operating via a transformer 2, for example the line voltage, in the circuit between the emitter electrode and the collector electrode of a transistor 4, which is preferably a junction transistor. In the circuit between the base electrode and the emitter electrode of the transistor 4 provision is furthermore made of a voltage supply source 5, the polarity of which corresponds to the blocking direction between these electrodes, so that, if no further measures were taken, the transistor would be cut off. However, the blocking of the transistor 4 is temporarily overcome by the supply source 3 which, via the transformer 2 also supplies an alternating voltage $V_b$ to the circuit between the base electrode and the emitter electrode.

Figure 2:
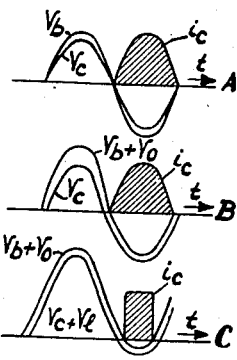
Fig. 2 is a series of voltage-time diagrams illustrating the operation of the invention.

The operation of the circuit arrangement of the present invention is explained with reference to Fig. 2. In Fig. 2A the alternating voltages $V_b$ and $V_c$, applied by the supply source 3 to the base electrode and the collector electrode respectively of the transistor 4, are plotted as a function of time $t$. If the voltage $V_o$ of the supply source 5 is assumed to be equal to zero, substantially no current will pass through the transistor during the positive phase of these alternating voltages $V_b$ and $V_c$, while during the negative phase of these voltages a considerable collector current $i_c$ flows through the transistor 4 and the load 1. However, if the voltage $V_o$ of the supply source 5 is positive, the said collector current $i_c$ will flow only during a shorter part of the period of the alternating supply voltage, as is evident from Fig. 2B. By controlling this voltage $V_o$, the power supplied to the load 1 may thus be controlled.

The voltages $V_b$ and $V_c$ and the impedance of the load 1 are preferably chosen to be so high that during the current-passing period of the transistor 4 only a very low voltage is operative between the emitter electrode and the collector electrode, so that the power dissipated in the transistor during this period remains materially below the maximum permissible power, whereas the power supplied to the load 1 can materially exceed said maximum permissible power.

The greatest sensitivity of the control is obtained, if the voltage $V_o$ is approximately equal to the amplitude of the voltage $V_b$, as is evident from Fig. 2C. By means of a smoothing capacitor 7, in parallel with the load 1, the current passing through the load may be smoothed. In this case, it is true, the voltage $V_c+V_1$ at the collector electrode is raised by the direct voltage $V_1$ across the parallel combination 1—7. However, during the positive phase the voltage can remain below the voltage $V_b+V_o$ at the base electrode, so that during the positive phase of the voltages $V_c+V_1$ and $V_b+V_o$ the collector-base electrode path of the transistor 1, operating as a rectifier, remains cut off, whereas during the negative phase of these voltages the control-voltage $V_b+V_o$ determines the time interval during which the collector current $i_c$ flows.

Moreover, it is then advisable to connect an inductor 8 in series with the combination 1—7, in order that during the current-conveying period of the transistor 4 the collector voltage remains very low, so that overload is avoided. The inductor 8 may advantageously be in resonance with the capacitor 7 at the frequency of the voltage supply source 3.

Figure 3:
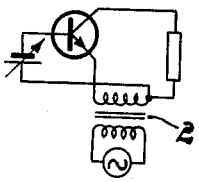
Fig. 3 is a simplified modification of the embodiment of Fig. 1.

The voltage $V_b$ may be equal to the voltage $V_c$; in which case, the circuit arrangement may be simplified as in Fig. 3, wherein the transformer 2 has only one secondary winding. The voltage $V_b$ may exceed $V_c$, in which case this secondary winding may, if desired, be provided with a tapping.

Figure 4:
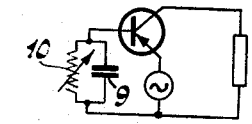
Fig. 4 is a modification of the embodiment of Fig. 3.

Moreover, as in Fig. 4, a voltage $V_o$ approximately equal to the amplitude of the voltage $V_b$ may be produced by base rectification by including a variable resistor 10, decoupled by a capacitor 9, in the base circuit of the transistor. The voltage $V_o$, produced across the RC-combination 9—10 decreases as the resistor is adjusted to a lower value.

Figure 5:
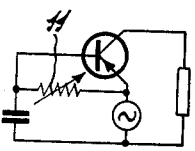
Fig. 5 is a further modification of the embodiment of Fig. 3.

Referring to Fig. 5, the resistor 10 shown in Fig. 4, is replaced by a variable resistor 11, connected between the base electrode and the emitter electrode. This gives rise to a phase shift between the base voltage and the emitter voltage, which may lead to an unwanted base current in the control-circuit. The circuit arrangement of Fig. 5 operates otherwise approximately in the same manner as that of Fig. 4.

Figure 6:
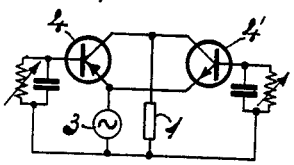
Fig. 6 is a modification of the embodiment of Fig. 4.

Fig. 6 is the circuit arrangement of Fig. 4 in push-pull embodiment, comprising a pnp-transistor 4 and an npn-transistor 4'. The common emitter circuit includes the alternating supply voltage source 3 and the common collector circuit includes the load 1, which is traversed by a controllable alternating current. In a similar manner, a push-pull embodiment comprising two npn- or two pnp-transistors respectively may be obtained, the alternating voltage of the supply source 3 being applied in push-pull to the emitter electrodes of these transistors.

Figure 7:
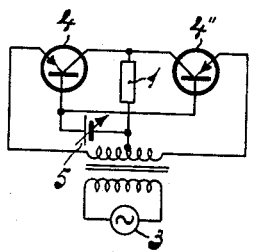
Fig. 7 is still a further modification of the embodiment of Fig. 3.

Fig. 7 is a similar circuit arrangement, in which two pnp-transistors 4 and 4" are provided with a common supply source 5 for producing the desired base blocking voltage. The two circuit arrangements operate in a manner such that in one phase of the alternating voltage of the supply source 3 one transistor allows current to pass to the load 1, the other transistor being then cut off, whereas in the opposite phase of said alternating voltage the current-conveying transistor and the cut-off transistor are interchanged.

It is to be understood that the invention is not limited to the details disclosed but includes all such variations and modifications as fall within the spirit of the invention and the scope of the appended claims.

What is claimed is:

1. A circuit arrangement for controlling the supply of power from a source of alternating voltage to a load comprising a transistor having an emitter electrode, a collector electrode and a base electrode, said source of alternating voltage being connected in series with said load between said emitter electrode and said collector electrode, a source of blocking voltage connected between said base electrode and said emitter electrode for rendering said transistor inoperative, and means for superimposing on said blocking voltage an auxiliary alternating voltage derived from said source of alternating voltage, said auxiliary alternating voltage having a magnitude during a portion of each cycle thereof which exceeds the magnitude of said blocking voltage whereby said transistor is rendered operative during said portion of each said cycle.

2. A circuit arrangement for controlling the supply of power from a source of alternating voltage to a load comprising a transistor having an emitter electrode, a collector electrode and a base electrode, said source of alternating voltage being connected in series with said load between said emitter electrode and said collector electrode, a source of blocking voltage connected between said base electrode and said emitter electrode for rendering said transistor inoperative, and means for superimposing on said blocking voltage an auxiliary alternating voltage derived from said source of alternating voltage, said auxiliary alternating voltage being substantially equal in magnitude to said source of alternating voltage and having a magnitude during a portion of each cycle of said auxiliary alternating voltage which exceeds the magnitude of said blocking voltage whereby said transistor is rendered operative during said portion of each said cycle.

3. A circuit arrangement for controlling the supply of power from a source of alternating potential to a load comprising a transistor having an emitter electrode, a collector electrode and a base electrode, said source of alternating potential being connected in series with said load between said emitter electrode and said collector electrode, a source of blocking potential connected between said base electrode and said emitter electrode for rendering said transistor inoperative, said source of blocking potential comprising a variable direct voltage source, and means for superimposing on said blocking potential an auxiliary alternating potential derived from said source of alternating potential, said auxiliary alternating potential having a magnitude which slightly exceeds the magnitude of said blocking potential during a portion of each cycle thereof whereby said transistor is rendered operative during said portion of each said cycle.

4. A circuit arrangement for controlling the supply of power from a source of alternating potential to a load comprising a transistor having an emitter electrode, a collector electrode and a base electrode, an inductor, said source of alternating potential being connected in series with said load and said inductor between said emitter electrode and said collector electrode, a capacitor connected in shunt with said load, a source of blocking potential connected between said base electrode and said emitter electrode for rendering said transistor inoperative, and means interposed between said base electrode and said emitter electrode for deriving an alternating voltage from said source of alternating potential, said derived alternating voltage having a magnitude during a portion of each cycle thereof which exceeds the magnitude of said blocking potential whereby said transistor is rendered operative during said portion of each said cycle.

5. A circuit arrangement as claimed in claim 1, wherein said source of blocking voltage comprises a variable resistor and a capacitor connected across said resistor, whereby said blocking voltage is produced by base-emitter rectification of said auxiliary alternating voltage.

6. A circuit arrangement as claimed in claim 1, wherein said means for superimposing said auxiliary alternating voltage on said blocking voltage is connected in series with the series connection of the base-emitter path of said transistor and said source of blocking voltage.

7. A circuit arrangement as claimed in claim 5 wherein said means for superimposing said auxiliary alternating voltage on said blocking voltage is connected in series with the series connection of the base-emitter path of said transistor and said source of blocking voltage.

8. A circuit arrangement as claimed in claim 2 wherein said source of blocking voltage comprises a variable resistor and a capacitor connected across said resistor, whereby said blocking voltage is produced by base-emitter rectification of said auxiliary alternating voltage.

9. A circuit arrangement as claimed in claim 2 wherein said source of alternating voltage is connected between said emitter electrode and the respective terminals of said load and of said source of blocking voltage remote from said collector electrode and from said base electrode respectively.

10. A circuit arrangement as claimed in claim 2 wherein said means for superimposing said auxiliary alternating voltage on said blocking voltage is connected in series with the series connection of the base-emitter path of said transistor and said source of blocking voltage, and said source of alternating voltage is connected between said emitter electrode and the respective terminals of said load and of said source of blocking voltage remote from said collector electrode and from said base electrode respectively.

11. A circuit arrangement for controlling the supply of power from a source of alternating voltage to a load, comprising a pair of transistors of opposite conductivity type, each of said transistors having an emitter electrode, a collector electrode and a base electrode, means interconnecting the emitter electrodes of said transistors, means interconnecting the collector electrodes of said transistors, common coupling means interconnecting the base electrodes of said transistors, said load being connected between said collector interconnecting means and said common base coupling means, said common base coupling means comprising a source of blocking voltage for each of said transistors connected to the base electrode of each of said transistors for rendering each of said transistors inoperative, said source of alternating voltage being connected between said common base coupling means and said emitter interconnecting means, the voltage of said source of alternating voltage having, during a portion of each half cycle thereof, a magnitude which exceeds the magnitude of said blocking voltage, whereby said transistors are alternately rendered operative, each during said portion of a different one of any two successive half cycles of said alternating voltage.

12. A circuit arrangement as claimed in claim 11, wherein each source of blocking voltage comprises a variable resistor and a capacitor connected in parallel with said resistor, whereby each blocking voltage is produced by base-emitter rectification of said alternating voltage.

13. A circuit arrangement for controlling the supply of power from a source of alternating voltage to a load, comprising a pair of transistors of the same conductivity type, each having an emitter electrode, a collector electrode and a base electrode, common coupling means interconnecting the emitter electrodes of said transistors, means interconnecting the collector electrodes of said transistors, means interconnecting the base electrodes of said transistors, means for supplying a voltage from said source of alternating voltage across said common emitter coupling means, said coupling means including a tapping point, and a source of blocking voltage for rendering said transistors inoperative, said source of blocking voltage being connected between said base interconnecting means and said tapping point, said voltage across said common emitter coupling means having, during a portion of each half cycle thereof, a magnitude which exceeds the magnitude of said blocking voltage, whereby said transistors are alternately rendered operative, each during said portion of a different one of any two successive half cycles of said alternating voltage.

References Cited in the file of this patent
UNITED STATES PATENTS

| | | |
|---|---|---|
| 2,644,892 | Gehman | July 7, 1953 |
| 2,666,819 | Raisbeck | Jan. 19, 1954 |
| 2,680,160 | Yaeger | June 1, 1954 |
| 2,691,073 | Lowman | Oct. 5, 1954 |
| 2,693,568 | Chase | Nov. 2, 1954 |
| 2,698,392 | Herman | Dec. 28, 1954 |
| 2,728,857 | Sziklai | Dec. 27, 1955 |
| 2,774,021 | Ehret | Dec. 11, 1956 |
| 2,782,267 | Beck | Feb. 19, 1957 |
| 2,812,390 | Van Overbeek | Nov. 5, 1957 |
| 2,851,592 | Webster | Sept. 9, 1958 |